(12) United States Patent
Chandra

(10) Patent No.: US 7,979,300 B2
(45) Date of Patent: Jul. 12, 2011

(54) BUSINESS RATINGS DETERMINED FROM NON-RATING INFORMATION

(76) Inventor: Bobby A. Chandra, Saratoga, CA (US)

( * ) Notice: Subject to any disclaimer, the term of this patent is extended or adjusted under 35 U.S.C. 154(b) by 463 days.

(21) Appl. No.: 11/825,773

(22) Filed: Jul. 9, 2007

(65) Prior Publication Data

US 2008/0015928 A1     Jan. 17, 2008

Related U.S. Application Data

(60) Provisional application No. 60/819,945, filed on Jul. 11, 2006.

(51) Int. Cl.
*G06F 17/00*     (2006.01)
(52) U.S. Cl. ..................... 705/7.29
(58) Field of Classification Search ............ 705/10, 705/7.29
See application file for complete search history.

(56) References Cited

U.S. PATENT DOCUMENTS 7,486,958 B2 *  2/2009  Sheha et al. ............... 455/456.3
7,536,190 B1 *  5/2009  Creemer .................... 455/456.3

OTHER PUBLICATIONS

Salerno et al; Buddy: fusing multiple search results together; 2003; SPIE-INT. Soc. Opt. Eng; 1 page.*

* cited by examiner

*Primary Examiner* — Thomas Dixon
(74) *Attorney, Agent, or Firm* — David T. Millers

(57) ABSTRACT

Address books, activity logs, or similar data that are normally prepared by people for purposes other than rating businesses can be parsed and processed to rate businesses without requiring users to complete reviews. As a result, a large amount of rating data is available and may provide business ratings and rankings that are more complete and statistically accurate. A local search site can provide users with lists of businesses with rankings or ratings based on community preferences as reflected in user data and activity logs.

20 Claims, 5 Drawing Sheets

US 7,979,300 B2

BUSINESS RATINGS DETERMINED FROM NON-RATING INFORMATION

CROSS-REFERENCE TO RELATED APPLICATIONS

This patent document claims benefit of the earlier filing date of U.S. provisional patent application No. 60/819,945, filed Jul. 11, 2006, which is hereby incorporated by reference in its entirety.

BACKGROUND

Local search sites currently available on the Internet can be used to search for businesses that are geographically close to a user-identified location, e.g., close to a user's home address. To add value to the search results, local search sites have also attempted to provide ratings or rankings of such businesses. However, the common methods for rating businesses have not been completely adequate.

One rating method relies on customer reviews of the businesses. This method requires customers to manually enter a review of or otherwise rate businesses, e.g., on a scale from 1 to 5. This "business review" method typically fails to provide a sufficient number of ratings to accurately reflect the community's opinion of businesses and often fails to provide any ratings or reviews at all for many businesses. One of the reasons for the shortage of reviews is that customers have little incentive to rate or review businesses, so many businesses go unranked.

Another rating method rates a business by counting the number of hyperlinks that lead to the business' website. The more links to a business' website, the higher the business is rated or ranked. A shortcoming of this approach is that many small businesses do not have websites and therefore a count of links to the business' website is not possible. Further, it is not clear whether a large number of links indicates a well operated business or an Internet-savvy business.

In view of the shortcomings of existing technology, systems and methods for rating businesses are sought that do not require users to spend time manually reviewing a business and do not depend on a business to be Internet-savvy or on there being hyperlinks to a business' website. These systems and methods should still able to rank a wide variety of businesses across many categories.

SUMMARY

In accordance with an aspect of the invention, user activities such as entering contact information in e-mail address books or similar contact lists, requesting driving directions to a business, using a global positioning system (GPS) to locate a business, telephoning a business, requesting information on a business, searching for a specific business, entering data into a digital calendar, or conducting transactions with a business provide data that can be parsed and processed to determine ratings or rankings of businesses. In general, personal decisions such as including a business in an address book, requesting driving directions or GPS information for a business, or telephoning a business indicate interest in or a sufficient level of satisfaction with the businesses that the person would contact, purchase from, or use the businesses. Data, which is recorded or collected for purposes that benefit users and not for rating purposes, can thus provide implicit endorsements of businesses and can be analyzed to produce business ratings or rankings. In contrast, completing reviews require time and effort from people who generally receive no direct benefit from doing so. The business rating process does not require any of the customer's time to complete reviews because customers' choices have already resulted in entry of the raw data for other purposes. As a result, more data is available than with current rating methods, and the larger amount of data may provide ratings and rankings that are more complete and statistically accurate. Further, the nature of the data on which evaluations are based may be sufficient to permit additional evaluations for factors such as the demographics of the users, the timeliness of implicit endorsements, or other user-defined criterion selected to provide ratings customized for the particular user.

A local search site can provide users with a list of businesses in their area with rankings or ratings based on people's preferences as reflected by the people's activities.

DESCRIPTION OF THE DRAWINGS

Use of the same reference symbols in different figures indicates similar or identical items.

DETAILED DESCRIPTION

Rating or ranking of businesses can be performed through parsing and processing user data that records or logs people's actions or activities to determine the popularity of businesses as indicated by actions that provide an implicit endorsement of the business. In general, specific activities such as people using address books to save contact information for a business that they may want to contact again, requesting driving directions to the business, or telephoning the business implies the people have expressed interest in or established an ongoing relationship with a business. Therefore, this provides a tacit endorsement of the business and an indication of the popularity of the business. Accordingly, such user information, which is tabulated or recorded as part of many services that are unrelated to rating businesses, can be processed to produce ratings for businesses.

Figure 1A:
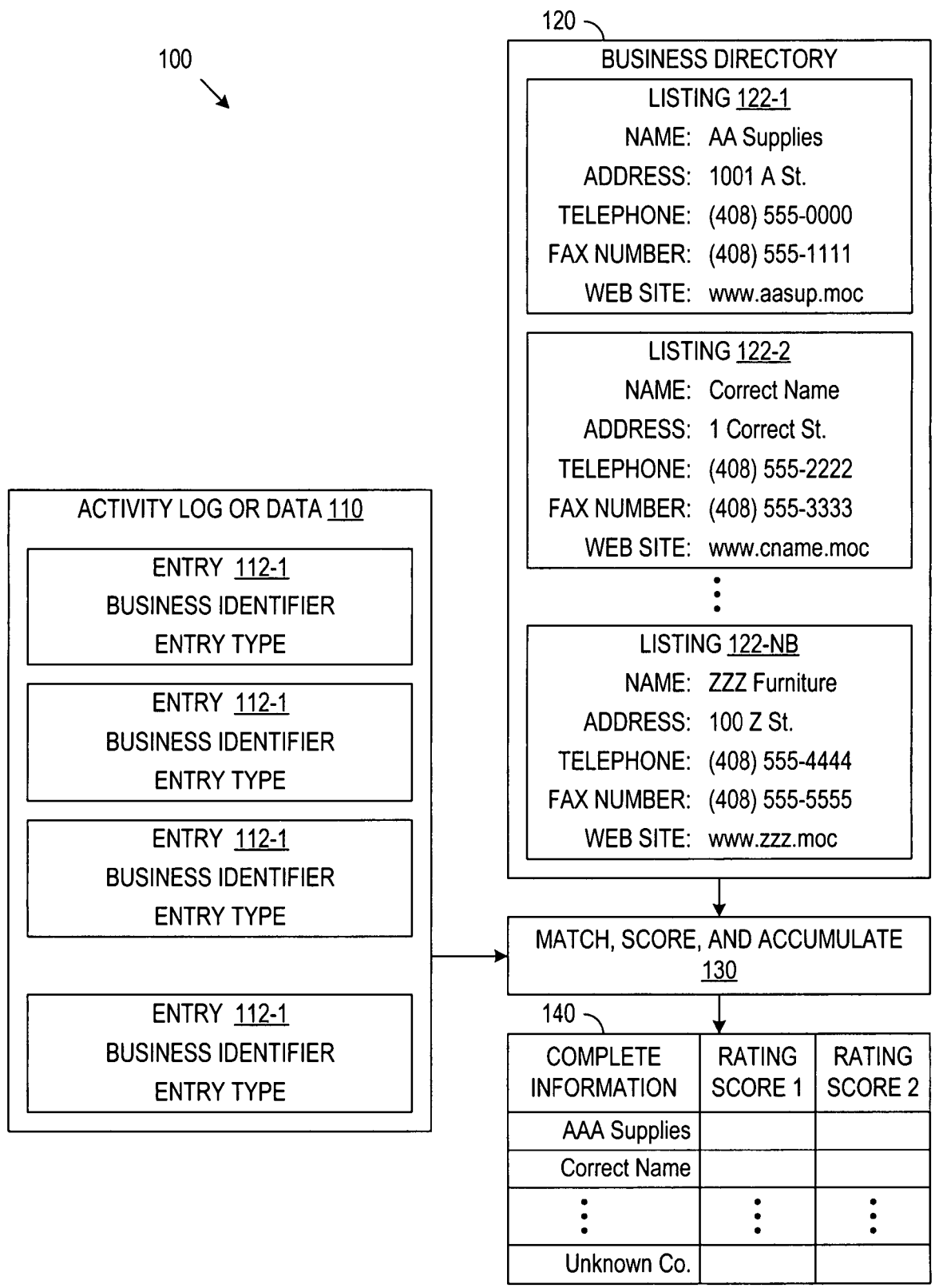
FIG. 1A is a block diagram illustrating a system that determines ratings in accordance embodiment of the invention using a business directory and entries documenting people's recorded user data.

FIG. 1A illustrates a system 100 in which a rating process 130 uses an activity log or user data file 110 and a business directory 120 to construct a database 140 containing business rating or ranking information. Data 110 contains a set of entries 112-1 to 112-N (generically referred to herein as entries 112.) Entries 112 are data structures that include user-inputted data or data recorded as the result of some user activities. Such activities include but are not limited to a user saving the contact information for a business in an address book, requesting driving directions to a business, using GPS to locate a business, or telephoning a business. Data 110 may be collected by services or user software that is not directed to rating of business. Some examples of data sources include web services or computer programs for keeping address books, web sites that provide and record requests for driving directions, logs of web searches for specific businesses, logs of telephone or Internet information requests for specific businesses, and any service or business that records user information such as transaction lists or phone logs. Even digital calendar data, text notes, text documents, and tagged digital photographs could be used and evaluated using the techniques disclosed herein to rate businesses.

Each entry 112 includes some information that can be used to identify a business and may additionally contain data specific to the type of activity recorded. The type of business identifier in an entry 112 will depend on the type of entry in data 110. For example, if data 110 is a list of user requests for driving directions, the business identifier can be the user-entered destination address. If data 110 is from an address book or a telephone log, the business identifier may be a telephone number. If the data 110 is from a GPS device, the business identifier may be longitude and latitude information.

Figure 1B:
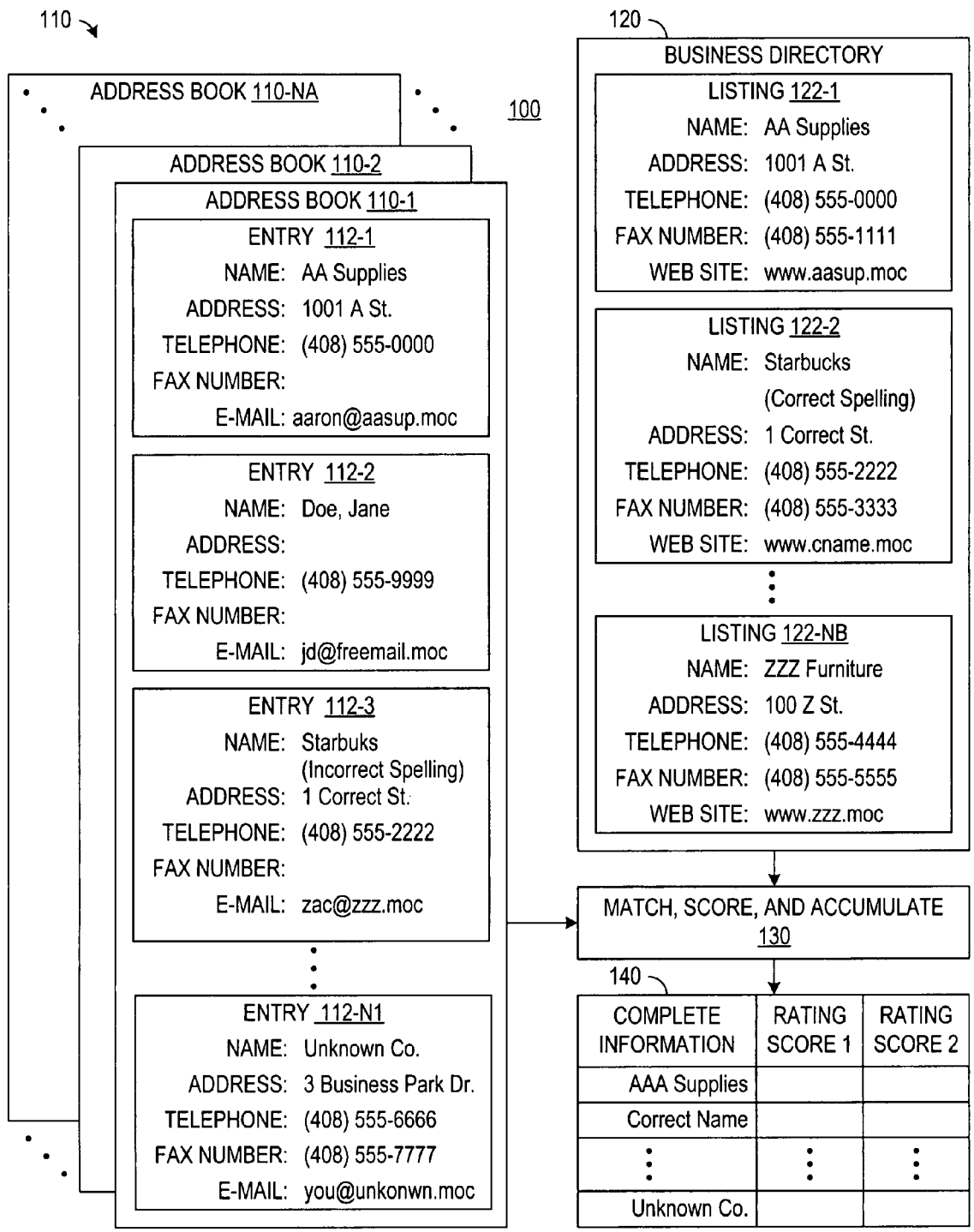
FIG. 1B is a block diagram illustrating relationships of address books, a business directory, and ratings determined in accordance with an embodiment of the invention.

FIG. 1B illustrates a specific embodiment of system 100 in which user data 110 is a set of address books 110-1 to 110-NA. The phrase "address book" is used here in a general sense and includes any system for recording contact information such as but not limited to contact name, company name, e-mail addresses, and telephone numbers. In this embodiment, each entry 112 indicates user data consisting of recorded contact information. The contact information recorded in address books 110-1 to 110-NA may correspond to businesses or to personal contacts, but the typical contact information such as name, address, telephone, number, fax number, and e-mail address are identifiers that can be used to distinguish a business entry from a non-business entry.

Address books 110-1 to 110-NA (or processed data or entries derived from such address books) can be obtained from a variety of sources. Examples of sources of address books 110-1 to 110-NA are web sites that provide web mail to the general public and also provide on-line address books or contact lists. In particular, web sites such as Yahoo® and Hotmail® incorporate address and contact lists as part of their web mail service. Personal information manager software such as Microsoft® Outlook® that maintain contact lists on personal computers are also sources of information that can be evaluated by this rating process. Other sources of address books include but are not limited to a mobile phone's contact list, a contact manager address book (i.e., ACT), and a sales-force automation contact list (i.e., Salesforce.com). However, in an exemplary embodiment of the invention described for illustrative purposes, each of address books 110-1 to 110-NA is an e-mail address book for a different user and contains information that the user entered for their own use.

Each of address books 110-1 to 110-NA typically contains multiple entries 112. For example, one address book 110-1 in FIG. 1B contains N1 entries 112-1 to 112-N1. Each entry 112 generally corresponds to a contact that may or may not be associated with a business. Within each entry 112 are multiple fields for information such as contact name, mailing address, telephone numbers, and e-mail address. The exact format of an entry 112, e.g., the number, arrangement, and types of fields per entry 112, will depend on the source of the address book. The contents of entries 112 depend on the users and in general do not include information in every field.

Business directory 120 is a database or text file of businesses which can be referenced digitally to identify entries 112 that correspond to businesses. Business directory 120 can be any available listing of businesses and may, for example, be based on published telephone directories or lists generated by government agencies. Further, while the illustrated embodiment of the invention shows a single business directory 120, multiple business directory data sources may be utilized or combined when checking whether an entry is a legitimate business and for use in database completion as described further below. In FIG. 1A or 1B, business directory 120 includes multiple business listings 122-1 to 122-NB, which are sometimes generically referred to herein as listings 122. Each listing 122 includes a set of fields with the fields respectively corresponding to information such as a business name, a business street address, a business telephone, business fax number, a business e-mail address, and a web site URL. The fields in listings 122 of business directory 120 may be the same as the fields in entries 112 of address books 110, or the fields in listings 122 may differ from the fields in entries 112.

Rating process 130, which is typically implemented by a program and executed by a computer, parses each entry 112 in user data 110 and determines whether the entry 112 matches any listing 122 in business directory 120. If a match is found, process 130 can then assign a value or score to the match and accumulate the scores for each business in a database 140. The score for each match in general may depend on the type and quality of the matched entry 112 and/or the extent of the match. For example, an entry corresponding to a request for driving directions may be given a lower score that the score for a matching entry in an address book because an entry in an address book may indicate intent to return to a business while driving directions may indicate a first visit to a business. Also, a higher score may be given to more complete entries if completeness is believed to indicate the value a user places on the contact.

Entries 112 in some cases may contain a user's personal information that is intended to be kept confidential. However, entries 112 in user data 110 may be untraceable to specific users, and rating process 130 can determine ratings or scores that are aggregated into database 140 without retaining any confidential information that can be traced to any particular user. Additionally, processing of entries 112 can be performed by the party or service entrusted to maintain data 110, e.g., by the web mail service, so that database 140, which can be made available to a local search site, does not reveal any personal or confidential information.

Figure 2:
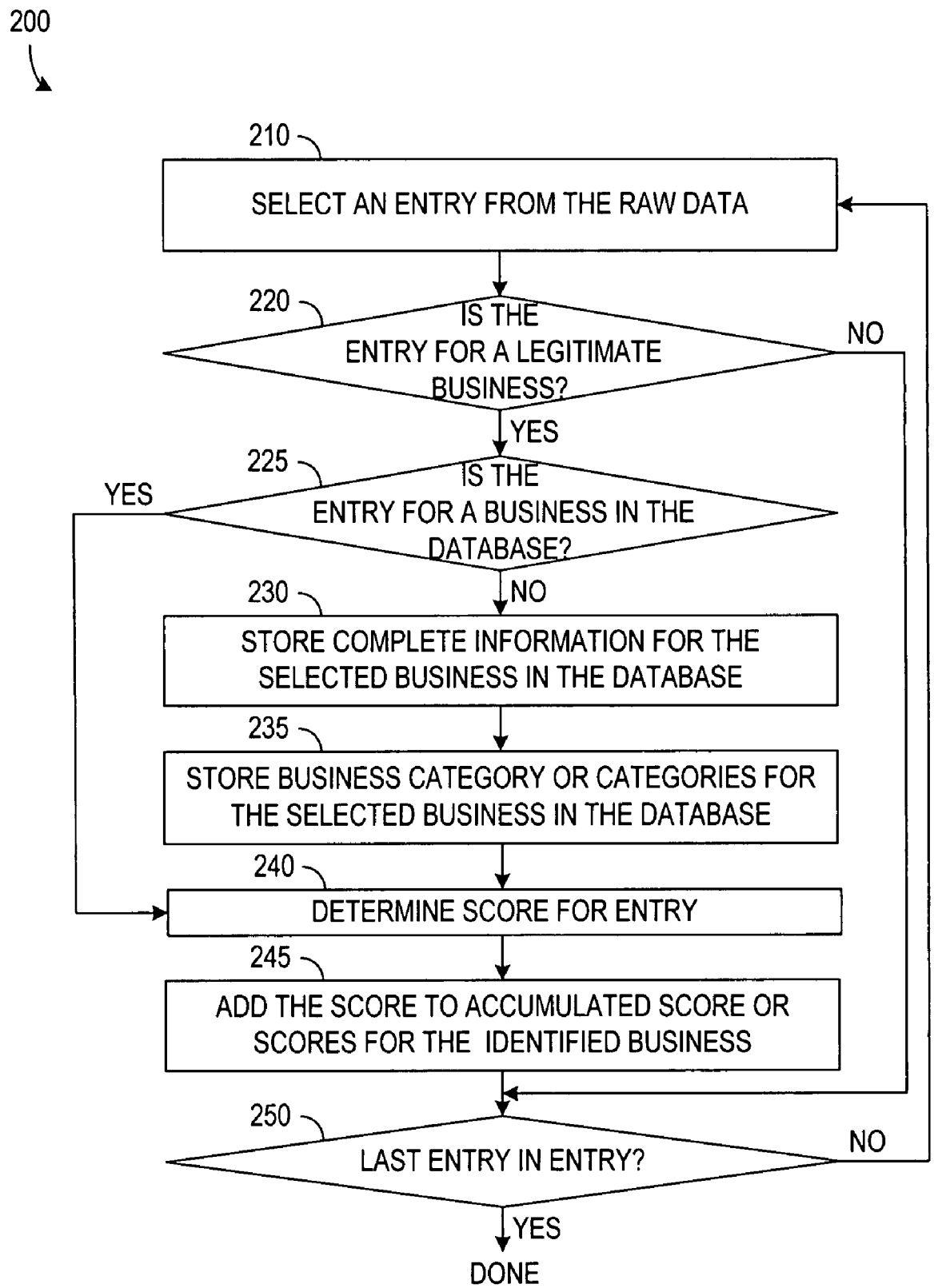
FIG. 2 is a flow diagram of a process for generating a ratings database in accordance with an embodiment of the invention.

FIG. 2 is a flow diagram illustrating an embodiment of a process 200 for constructing a database for rating or ranking businesses based on user data 110 and business directory 120 of FIG. 1A or 1B. Process 200 begins with a step 210 of selecting an entry 112 from user data 110. A step 220 then determines whether the selected entry 112 corresponds to a legitimate business. The identification of an entry as corresponding to a legitimate business can be performed by comparing the selected entry 112 to listings 122 in the business directory 120.

Identifying the selected entry 112 as corresponding to a business involves comparing information from one or more fields of the selected entry 112 with information from one or more corresponding fields of listings 122 in business directory 120. The specific comparison performed depends on available fields or the business identifier provided by the entry. For example, a simple check for a match can be run using the telephone number because the telephone number provides a hash value that simplifies identification of a matching listing 122. If a matching field is found in a listing 122, the other information (e.g., a business name or address) if available from the selected entry 112 can also be checked against the listing 122 in business directory 120 that has the matching telephone number. If the majority of the information in the selected entry 112 is found to be equivalent to information in the listing 122 in business directory 120, the contact is considered to be a legitimate business. If the check of business directory 120 does not reveal a match, the contact corresponding to the selected address book entry may be deemed illegitimate, e.g., not a business. Alternatively, the selected entry 112 may be deemed to refer to a legitimate business even if the business is not found in business directory 120, so that data 110 can be the source of additional businesses that are added to database 140. To improve efficacy of matching, normalization techniques may be used to facilitate comparisons. These techniques include but are not limited to removing non-numerical characters from the telephone number field, handling abbreviations in the street address fields such as rd for 'road', identifying truncated city names, and concatenating user data such as adding a user's area code to a seven-digit telephone number found in an entry 112.

Using the illustrated example of FIG. 1B, step 220 of FIG. 2, when comparing entries 112-1 to 112-N1 from address book 110-1 to business listings 122-1 to 122-NB, may determine that entries 112-1 and 112-3 match business listings 122-1 and 122-2 and are therefore legitimate businesses. It may be noted that a match can be found even when not all fields in an entry (as for example, in entry 112-1) are complete if the complete information sufficiently matches the corresponding business listing 122-1. A match may also be found as with entry 112-3 and listing 122-2 even though not all of the information in the entry 112-3 matches corresponding information in business listing 122-2. Accordingly, the criterion for determining that an entry 112 matches a business listing 122 does not require a complete match for all corresponding fields. An entry such as entry 112-2 that does not match any business listing 122 in business directory 120 can either be determined not to be a legitimate business or can be evaluated using other techniques.

If step 220 determines that the selected entry 112 is not a legitimate business (e.g., is a personal contact), process 200 branches from step 220 to a step 250 to select another entry 112 for comparison. Otherwise, process 200 branches to step 225 when step 220 finds a sufficient match to a listing 122 in business directory 120.

Step 225 determines whether the matching business has complete identifying information stored in database 140. The information is complete in the sense that all identifying information necessary for use, e.g., in a local search engine, is stored in database 140. If so, process 220 can branch to step 240 to determine a score for the match as described further below. If a business identified as legitimate is not in database 140, step 230 creates an entry in database 140 and/or attempts to store complete identifying information for the business in database 140. For example, if the business was determined to be legitimate after a comparison with a listing 122 in business directory 120, the information of that listing 122 can be used to complete identifying information for the corresponding entry in database 140. For example, if the selected address book entry 112 contains only a telephone number that matches a telephone number in business directory 120, the corresponding business name, address, and other pertinent information is taken from the matching business listing 122 is added for that business entry in database 140. The selected address book entry 112 may alternatively provide all or part of the identifying business information if a business is identified as legitimate using techniques other than a match in business directory 120.

A step 235 categorizes the businesses in database 140 and may be performed when a new entry in database 140 is created. Business category information can be obtained from business directory 120 or other sources.

A step 240 determines a score for the selected entry 112 when the selected entry 112 corresponds to a legitimate business. In a simple scoring process, each match between an entry 112 and a business listing 122 increments the score of the business by one. However, in accordance with a further aspect of the invention, scoring of the selected address book entry 112 can be based on the nature of the information in the selected entry 112. This may entail assessing the type of entry or the completeness and accuracy of the entry 112 for a business.

Figure 3:
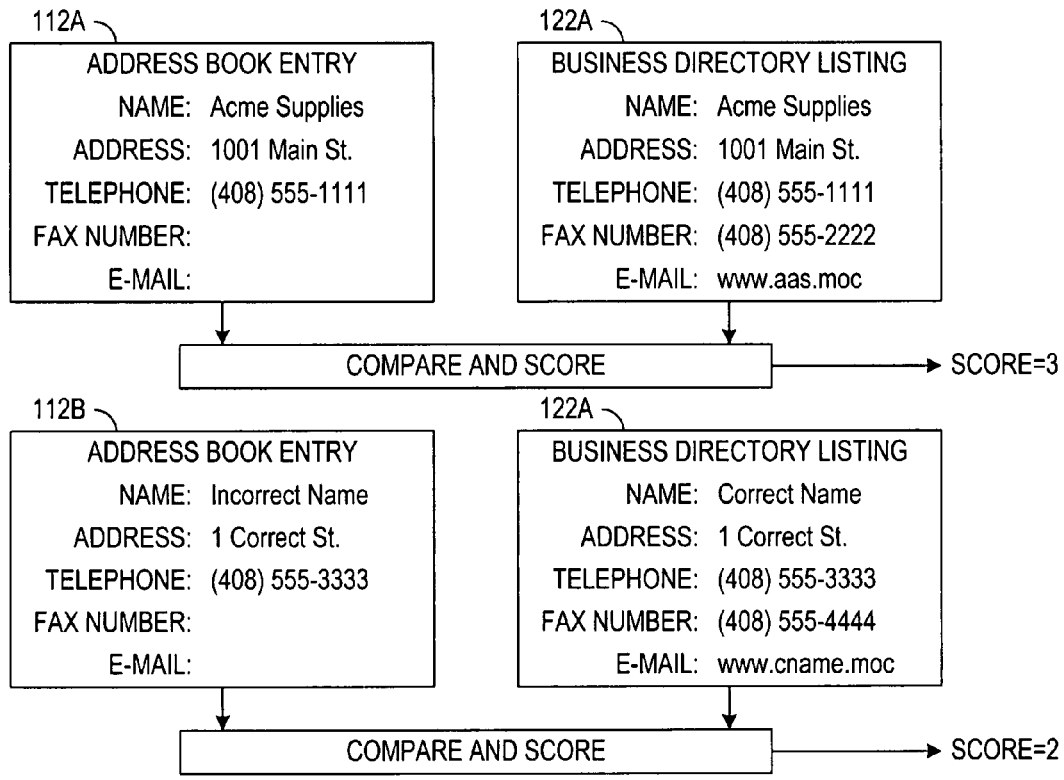
FIG. 3 illustrates a scoring process that instead of simply counting entries evaluates qualities of the entries in determining a rating or ranking in accordance with an embodiment of the invention.

FIG. 3 illustrates an example of a scoring process suitable for step 240 for the example of entries in an address book as illustrated in FIG. 1B. The scoring of FIG. 3 is based on completeness of the selected entry 112. If the selected entry 112 is more complete and correct, the business receives a higher score than if the entry 112 is relatively incomplete or contains errors. In FIG. 3, an address book entry 112A receives a score of 3 because three of the fields in address book entry 112A are completed and match a corresponding business listing 122A. Address book entry 112B receives a score of 2 because only two of the completed fields in the address book entry 112B match corresponding fields in a corresponding business listing 122B. This scoring technique may be altered for different embodiments of the invention, for example, a score may be based on a percentage of the fields in address book entries that are complete and match a corresponding business listing 112, which may be useful when analyzing address books that are from different sources and having different numbers of fields per entry. Also, matches in some fields could create a greater contribution to the score that do matches in other fields, and the score can be linearly or non-linearly related the count or percentage of complete matching fields. Additionally, the existence of incorrect information in a field of an address book entry, e.g., as in entry 112B of FIG. 3 could cause a subtraction in the score or cause the score to be set to zero.

Such scoring can provide a better rating result because a user taking more time to record business data often indicates that the user thinks more highly of the business than if the user records less information. More accurate information also indicates greater use of the entry. These scoring techniques illustrate a business' score or rating may not be strictly an aggregate or count of references to the business in address books or other user data but may also be a function of qualities of the data and its author such as how complete the entries were or the age of the author. Additionally, the rating method can use other factors in scoring such as the presence of notes associated with the contact information, characteristics of the person performing the recorded data, the accuracy of data entered, the date of the entry, or any other means of evaluating the grammar, quality, and completeness of the entry.

Step 245 of process 200 in FIG. 2 combines the score determined in step 240 with a previously accumulated score or scores determined in prior executions of step 245. A single score in general is sufficient for ranking of a business. However, separate scores can be maintained and distinguished, for example, by the date the entry was created or last modified (reflecting timeliness) or factors such as demographic information of the author or actor corresponding to the entry. Separation of scores in this manner may allow calculation of different scores or ranking of businesses, for example, based on a user's preferences when searching for businesses.

In step 250, process 200 branches back to select another entry 112 from data 110 unless process 200 has evaluated the last entry 112 in data 110. If the last entry has been evaluated, process 200 is done.

After data 110 of one or more types from one or more sources are scanned for businesses and scored according to the frequency of reference and the quality of the reference (as described above), each identified business has a cumulative rating. As noted above, a party such as a web mail service entrusted with confidential address books can use this approach to provide a list (e.g., database 140 of FIG. 1A or 1B) containing rating scores for business to a local search engine or other service without disclosing user confidential information. With the list or database, any set of businesses, e.g., business in a specific category and within a user-selected distance of a location, can be ranked according to their ratings.

Figure 4:
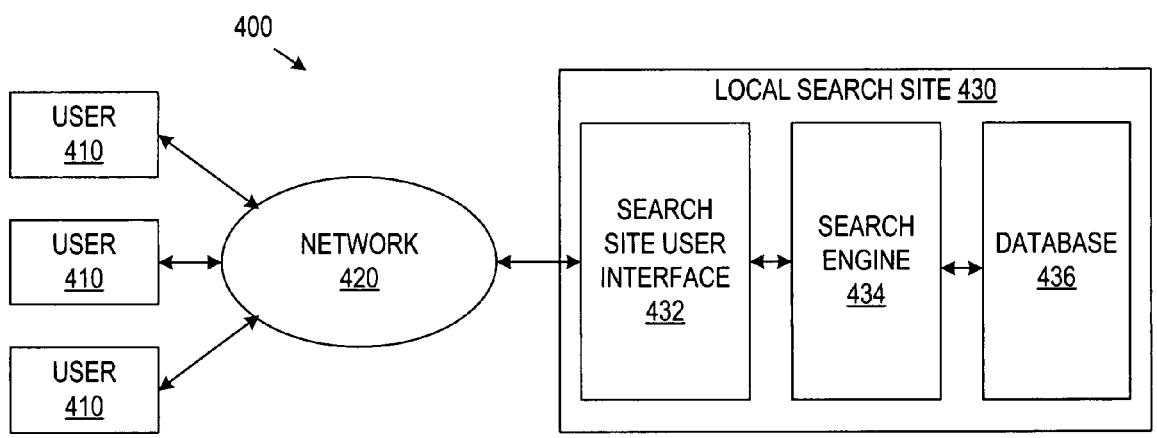
FIG. 4 is a block diagram of a system enabling a user interaction with a local search site in accordance with an embodiment of the invention.

FIG. 4 is a block diagram illustrating a system 400 that uses a database 436 generated from user data or user activity logs collected for other purposes. Users 410 in FIG. 4 are connected to a network 420 such as the Internet. Each user 410 generally operates a computer or other equipment with the necessary software and hardware for accessing a site 430 via network 420. Site 430, which can be hosted on a web server or other similar hardware connected to network 420, provides a user interface 432 that users 410 can use to conduct searches that a search engine 434 can perform on database 436.

A user 410 optionally can use the site 430 to submit information for inclusion in database 436 and to perform searches for businesses meeting user-selected criterion. A variety of submission techniques can be employed. For example, user 410 could e-mail an address book to site 430 or set up a webpage or website for data input. Alternatively, user interface 432 can provide an automated means for a user 410 to upload his or her contact lists through a webpage with an "upload file" feature. The user could also import his or her contacts from other online contact lists such as web mail address books. In this case, user interface 432 as presented to a user 410 allows the user to click a button and be prompted to select a file from his or her computer or from an online source. Once the user selects the appropriate file (e.g., an e-mail address book file), the user clicks OK and the file representing the user data or activity is uploaded to the server for the site 430. The code on the server processes the user data or user activity data, for example, using the techniques described above with reference to FIG. 2, to determine which contact entries are businesses, score the entries corresponding to businesses, and add scores to database 436. Additionally, as a service to the user 410, site 430 can complete and/or update business entries in the e-mail address book and return the enhanced address book file to the submitting user 410.

Figure 5:
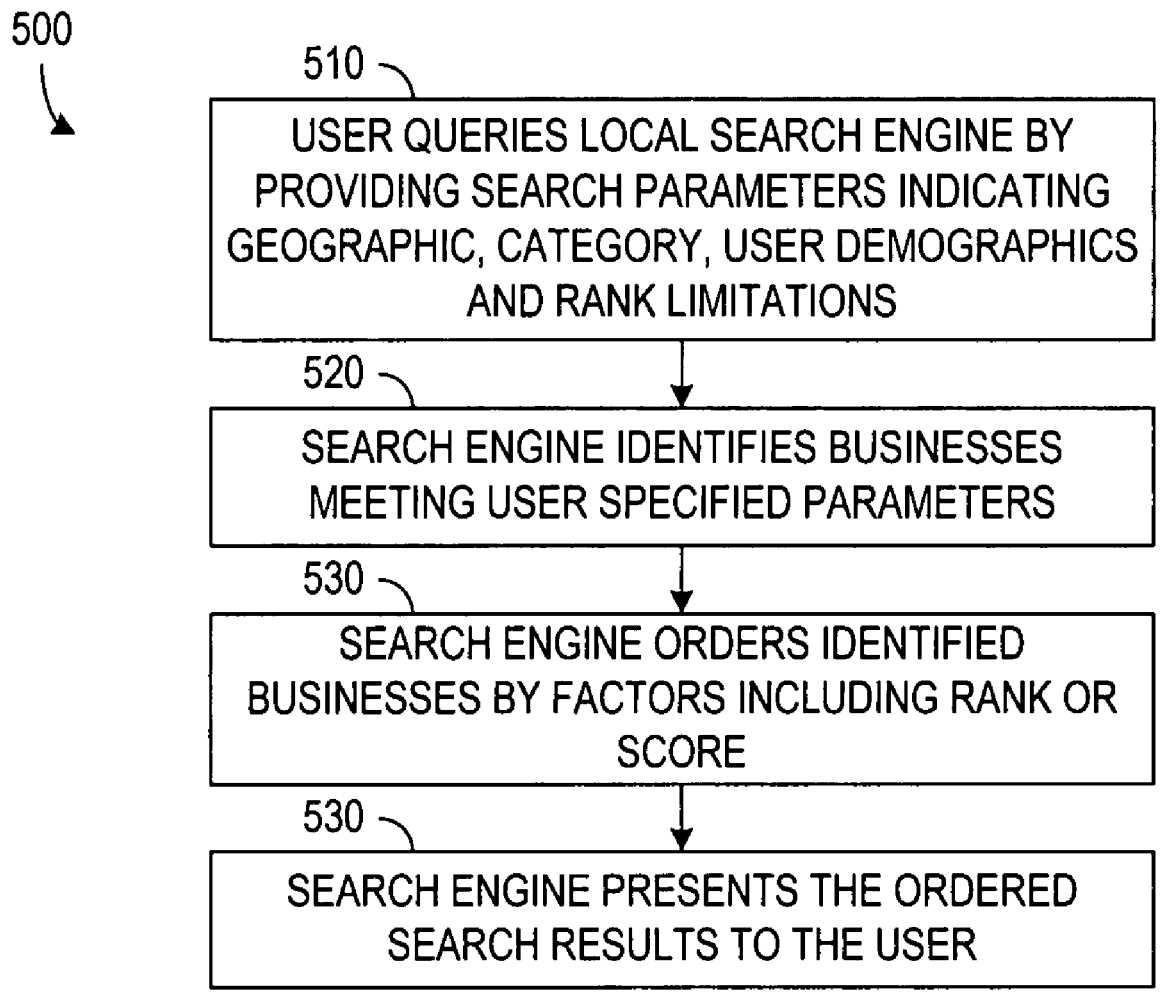
FIG. 5 is a flow diagram of a user interaction with a local search site in accordance with an embodiment of the invention.

A user 410 can also use site 430 to search database 436 for a particular business (i.e., "Joe's Restaurant" having a zip code "95070") or a kind of business (i.e., "Italian Restaurants" in "St. Louis, Mo.")). FIG. 5 illustrates a typical search process 500 in accordance with an embodiment of the invention. Process 500 begins with a user submitting a query to a local search engine by providing search parameters. The search parameters provide boundaries for a search and may indicate, for example, a geographic limitation, a business category, or other criteria.

The search engine in step 520 then searches the database for businesses meeting the limitations set forth in the search parameters and then in step 530 creates a list of the businesses found in an order that factors in the relevancy of the business, the geographic proximity of the business, and the rating for the business. The rating as indicated above may simply be an accumulated score determined as set forth above or may be a calculated rating based on multiple scores that are kept in the database but distinguished by factors such as timeliness. In step 530, the search engine presents the ordered list of businesses to the user. Once the user is shown the businesses corresponding to his or her query, the user can note information such as a phone number or click on the result for map directions or to receive more information on that particular business.

The processes described above, in general, can be embodied in firmware, software, or other instructions that can be processed on a computer and/or stored in a computer readable medium. Such computer readable media include but are not limited to CD-ROM, DVD-ROM, integrated circuit memory, magnetic media, optical media, and other storage devices, which may be directly connected to or incorporated in a computer or accessible through a network such as the Internet. The process may also be embodied in consumer devices such as cell phones.

Although the invention has been described with reference to particular embodiments, the description is only an example of the invention's application and should not be taken as a limitation. For example, the rating methods described above do not need to be limited to private businesses but can be used to rank other entities such as non-profits, governmental services, state parks, and other service providers. Further, there are a number of variations on how the end-user can access and use a database providing ratings. For example, the end-user could request information on a particular business rather than unspecified businesses in a business category, or the end-user could request the most popular or highest ranked businesses within varying search parameters. Various other adaptations and combinations of features of the embodiments disclosed are within the scope of the invention as defined by the following claims.

What is claimed is:

1. A process comprising:
a computer system processing data that represents people's activities or notes that are unrelated to rating of businesses to identify in the data entries that correspond to businesses;
the computer system determining respective scores for the entries corresponding to businesses;
determining a rating for each of the businesses from the scores of the entries that correspond to the business; and
using the ratings as an indication of the people's opinion of the businesses.

2. The process of claim 1, wherein identifying entries that correspond to businesses comprises for each entry, comparing information from the entry to corresponding information in a listing in a business directory.

3. The process of claim 2, wherein the information from the entry comprises a telephone number.

4. The process of claim 2, wherein the information from the entry comprises a street address.

5. The process of claim 1, wherein the scores are the same for all of the entries corresponding to the businesses, and the ratings are determined from counts of entries corresponding to businesses.

6. The process of claim 1, wherein for each of the entries corresponding to businesses, the score depends on a set of factors selected from a group consisting of completeness of the entry, accuracy of the entry, characteristics of a person associated with the entry, and a date of the entry.

7. The process of claim 1, wherein the data includes a plurality of address books that comprises at least one of: an e-mail address book maintained at a web mail service; a contact list maintained by a desktop e-mail program; a contact list maintained by personal information manager software; and a contact list maintained on a mobile telephone.

8. The process of claim 7, further comprising a user providing at least one of the address books.

9. The process of claim 1, wherein each of the entries corresponds to a request from one of the people for driving directions.

10. The process of claim 1, wherein the activity data comprises telephone logs of calls made by the people.

11. The process of claim 1, wherein the entries correspond to requests to a global positioning system.

12. The process of claim 1, wherein the entries correspond to requests for information on specific businesses.

13. The process of claim 1, wherein the entries correspond to searches on the Internet for specific businesses.

14. The process of claim 1, wherein the entries correspond to transactions with specific businesses.

15. The process of claim 1, wherein using the ratings comprises a search engine using the ratings to rank a list of businesses provided in response to a user query.

16. A computer readable media containing instructions that when executed on a computer performs the process of claim 1.

17. A process executed on a computing system, comprising:
operating a computer system to process a plurality of address books and identify which entries in the address books correspond to businesses; and
for each of the entries corresponding to businesses, updating a rating of a business that corresponds to the entry, wherein the ratings are used to indicate a community's opinion of the businesses.

18. The process of claim 17, further comprising:
a user providing search parameters to a site on the Internet; and
the site identifying businesses that corresponding to the search parameter, ranking the businesses according to the ratings, and presenting to the user a list of businesses corresponding to the search parameters in an order that factors in the ranking of the business.

19. A process comprising:
a computer system scanning data containing entries that are unrelated to rating of businesses;
the computer system identifying in the data entries that corresponds to businesses; and in response to each of the entries identified;
determining a score for the entry; and
using the score to update a rating for the business to which the entry corresponds, wherein the ratings are used to indicate a community's opinion of the businesses.

20. The process of claim 19, wherein the data corresponds to address books of individuals, and each of the entries corresponds to a contact in a corresponding one of the address books.

\* \* \* \* \*